United States Patent [19]

Stein et al.

[11] Patent Number: 5,589,856
[45] Date of Patent: Dec. 31, 1996

[54] SYSTEM & METHOD FOR DYNAMICALLY LABELED TOUCH SENSITIVE BUTTONS IN A DIGITIZING DISPLAY

[75] Inventors: Frank L. Stein, Vienna, Va.; Guy F. Verrier, Boca Raton, Fla.

[73] Assignee: International Business Machines Corporation, Armonk, N.Y.

[21] Appl. No.: 378,306

[22] Filed: Dec. 30, 1994

Related U.S. Application Data

[63] Continuation of Ser. No. 55,067, Apr. 29, 1993, abandoned.

[51] Int. Cl.[6] .................................................. G09G 5/00
[52] U.S. Cl. ............................................ 345/173; 345/146
[58] Field of Search ..................................... 345/173, 146

[56] References Cited

U.S. PATENT DOCUMENTS

| | | | |
|---|---|---|---|
| 4,396,977 | 8/1983 | Slater et al. ............................. | 345/173 |
| 4,587,630 | 5/1986 | Straton et al. . | |
| 4,686,332 | 8/1987 | Greanias et al. . | |
| 4,786,764 | 11/1988 | Padula et al. . | |
| 4,862,389 | 8/1989 | Takagi .................................... | 345/119 |
| 4,972,496 | 11/1990 | Sklarew . | |
| 4,992,630 | 2/1991 | Mietzko . | |
| 5,007,085 | 4/1991 | Greanias et al. . | |
| 5,117,071 | 5/1992 | Greanias et al. ......................... | 178/19 |
| 5,119,078 | 6/1992 | Grant ..................................... | 341/23 |
| 5,121,113 | 6/1992 | Kedge et al. ............................ | 345/173 |

*Primary Examiner*—Richard Hjerpe
*Assistant Examiner*—Vui T. Tran
*Attorney, Agent, or Firm*—Joseph C. Redmond, Jr.; Richard A. Tomlin

[57] ABSTRACT

A system and method are disclosed for dynamically labeling touch sensitive buttons in a digitizing display. The display is partitioned into a main panel display region and a button panel display region. A touch overlay is also partitioned into a main panel touch region and a main panel display region. A button panel driver program defines button touch areas and button display areas enabling the dynamic labeling and relabeling of the touch sensitive buttons and the simultaneous touching of combinations of the buttons with either a touch input or a stylus input to the overlay.

13 Claims, 9 Drawing Sheets

SYSTEM & METHOD FOR DYNAMICALLY LABELED TOUCH SENSITIVE BUTTONS IN A DIGITIZING DISPLAY

This application is a continuation application of Ser. No. 08/055,067, filed Apr. 29, 1993, now abandoned.

BACKGROUND OF THE INVENTION

1. Technical Field

The invention disclosed broadly relates to data processing systems and more particularly relates to improvements in input/output devices for pen-based computer systems.

2. Related Patents and Patent Applications

The following patents and patent applications are assigned to the IBM Corporation and are incorporated herein by reference.

U.S. Pat. No. 4,686,332 entitled "Combined Finger Touch and Stylus Detection System for Use on the Viewing Surface on a Visual Display Device," by Evon C. Greanias, et al.

U.S. Pat. No. 5,007,085 entitled "Remotely Sensed Personal Stylus," by Evon C. Greanias, et al.

U.S. Pat. No. 5,117,071 entitled "Stylus Sensing System," by Evon C. Greanias, et al.

Copending U.S. patent application Ser. No. 07/778,431, filed Oct. 16, 1991 entitled "Touch Overlay for Improved Touch Sensitivity," by Evon C. Greanias, et al.

Copending U.S. patent application Ser. No. 07/351,227, filed May 15, 1989 entitled "Flat Touch Screen Workpad for a Data Processing System," by Gordon W. Arbeitman, et al.

Copending U.S. patent application Ser. No. 07/969,864, filed Oct. 30, 1992 entitled "Architecture for Communication of Remote Devices to a Digitizing Display" by Guy F. Verrier, et al. 3. Background Art Pen-based computer systems have been described in the prior art, for example in the above referenced U.S. Pat. No. 4,686,332 by Greanias, et al. In that system, a touch overlay membrane is positioned over the viewing surface of a display device such as a computer monitor, for interacting with a pickup stylus. The pickup stylus described in the '332 patent is connected by means of a wire to the pen-based computer system. The pen-based computer system generates a radiative signal in the touch overlay. The radiative signal is picked up by the stylus and sent back over the wire to the pen-based computer. The computer then calculates the relative X-Y position of the stylus with respect to the overlay. The relative proximity Z of the stylus to the overlay is determined by the signal amplitude picked up by the stylus from the electromagnetic energy radiated from the overlay. An improvement in the stylus pickup antenna is described in the above cited U.S. Pat. No. 5,117,071 by Greanias, et l. In the '071 patent, the antenna configuration in the tip of the stylus is a small sphere, whose shape enables a uniform signal strength to be picked up without regard for the relative orientation of the stylus with respect to the planar surface of the overlay. A further improvement has been made to the stylus by eliminating the cable connection between the stylus and the pen-based computer system, as is described in U.S. Pat. No. 5,007,085 by Greanias, et al. In the '085 patent, the signal detected by the stylus antenna which has been picked up from the electromagnetic radiation emitted by the overlay, is converted into a second signal which is transmitted either by infrared radiation, microwave radiation or radio frequency radiation at a different frequency, from the stylus back to an electromagnetic detector coupled to the pen-based computer system. Another improvement to pen-based computer systems is described in the above referenced copending U.S. patent application Ser. No. 07/351,227, filed May 15, 1989 by Arbeitman, et al. In the Arbeitman, et al. patent application, a flat touch screen workpad is substituted for the combination of the computer display monitor and touch overlay membrane. In the Arbeitman, et al. patent application, the radiative pickup stylus is connected by means of a wire to the flat touch screen workpad, for receiving the electromagnetic radiation emanated from the overlay membrane, the wire transferring the detected signal from the pickup stylus back to the electronics contained in the flat touch screen workpad.

In the description of the invention contained herein, the term "digitizing display" will be used to generally refer to either the combination of a computer display monitor and touch overlay membrane described in the '085 patent or alternately, the workpad display and overlay described in the Arbeitman, et al. patent application.

The above cited U.S. Pat. No. 5,007,085 entitled "Remotely Sensed Personal Stylus," by Evon C. Greanias, et al., describes a pen-based computer system which has a digitizing display which radiates electromagnetic signals which are picked up by a remotely sensing personal stylus. The antenna in the tip of the stylus picks up the electromagnetic signals radiated from the display overlay, and converts those signals into a suitable form for retransmission back to the pen-based computer system. The relative signal strength of the signals picked up by the stylus is used to infer the relative separation distance Z of the tip of the stylus with respect to the overlay. The converted signals are transmitted back to the pen-based computer system by means of a transmitting circuit and transmitting antenna within the stylus. The technique for determining contact between the stylus tip and the surface of the overlay, is by measuring the relative signal strength of the electromagnetic signal picked up by the tip of the stylus.

A problem with this prior art is that the detection of actual touchdown of the stylus onto the workpad surface is not very sensitive. Consider in normal handwriting how the writer's hand pressure varies during the course of writing a signature. The pressure applied by the pen to the paper varies over the course of inscribing the signature on the paper and sometimes includes a slight raising of the pen from the surface of the paper. The process of writing a signature on a digitizing display by means of a radiative pickup stylus, does not faithfully reproduce the intended shape on the display screen. When the stylus is raised slightly from the surface of the digitizing display, the separation of the stylus tip from the surface will not be detected in prior art systems. What results is spurious traces and artifacts which remain in the "inked" depiction of the user's signature because the system cannot detect the actual small separation of the stylus from the surface of the digitizing display. This problem has been solved by the invention described in the above identified copending patent application Ser. No. 07/969,864 by Guy F. Verrier, et al.

Function keys on keyboards and mouse buttons are used today with personal computers to inform the computer and application programs of a user input selection. The flat touch screen workpad described in the above identified Arbeitman, et al. copending patent application, also provides buttons on the front bezel to provide function key, shift key and mouse buttons. Users of keyboard buttons have difficulty in remembering the meaning of the unlabeled buttons on keyboards and workpads of the prior art. In addition, the use of a control, alternate, or shift key in conjunction with other key depressions, is difficult or impossible in some touch screen embodiments, because the prior art touch screen apparatus is not able to detect multiple simultaneous finger touch or multiple simultaneous stylus inputs, as would be necessary in the simultaneous use of a shift key and another key on the workpad input. What is needed in the prior art is the ability to simultaneously touch or provide stylus input for multiple keys and shift keys or buttons on a digitizing display.

OBJECTS OF THE INVENTION

It is therefore an object of the invention to provide for the simultaneous input of touch or stylus signals to a digitizing display.

It is another object of the invention to provide for variable meaning of shift buttons on a digitizing display.

It is still a further object of the invention to provide dynamically labeled touch sensitive buttons in a digitizing display.

It is still another object of the invention to provide shift buttons on a digitizing display which are labeled in accordance with their current function.

It is still another object of the invention to provide for dynamically relabeled shift buttons on a digitizing display.

It is still another object of the invention to provide shift buttons on a digitizing display which can be simultaneously pressed in multiple combinations with either touch input or a stylus input.

It is still a further object of the invention to provide dynamically labeled shift buttons on a digitizing display which are compatible with a variety of application programs.

SUMMARY OF THE INVENTION

These and other objects, features and advantages are accomplished by the system and method for dynamically labeled touch sensitive buttons in a digitizing display. The invention is a part of a data processing system which includes a digitizing display for inputting two simultaneous touch inputs. The invention includes a digitizing display coupled to a computer, having a display surface partitioned into a main panel display region and a button panel region. A touch overlay is coupled to the computer and has a touch input surface partitioned into a main panel touch region which is juxtaposed with the main panel display region of the display. The touch overlay is also partitioned into a button panel touch region which is juxtaposed with a button panel display region of the display. A button panel driver program is stored in the computer, for defining a button touch area in the button panel touch region, for outputting a button value when the button touch area receives a touch input or a stylus input. The button panel driver program defines a button display area in the button panel display region, which is juxtaposed with the button touch area. The button display area will display a button indicium representing the button value and it identifies the location of the button touch area. When the computer receives a first touch input or a first stylus input in the main touch panel region and simultaneously receives a second touch input in the button touch area or stylus input in the button touch area, the computer is able to separately identify the touch or stylus input in the button touch area and to provide the button value as an output.

The computer will store a default button specification table describing a plurality of button touch areas and corresponding button display areas. The button panel driver program uses the default table to define the plurality of button touch areas in the touch overlay and the corresponding button display areas in the display.

In accordance with the invention, an application program stored in the computer can have an alternate button specification table describing a plurality of alternate button touch areas and corresponding alternate button display areas. The button panel driver program will use the alternate table to define the plurality of alternate button touch areas in the touch overlay and the corresponding alternate button display areas in the display.

The button specification tables will include information to generate the image of the indicium which represents the intended button value. The button panel driver program will paint the indicium image at the designated location in the button panel of the display. The button panel driver program can paint alternate button indicium images in the button panel under user control or under application program control.

The resulting invention provides the ability to dynamically label touch sensitive buttons in a digitizing display under user control or application program control, and can accommodate multiple simultaneous button and main panel key touch or stylus inputs.

DESCRIPTION OF THE DRAWINGS

These and other objects, features and advantages will be more fully appreciated with reference to the accompanying figures.

DISCUSSION OF THE PREFERRED EMBODIMENT

Figure 1:
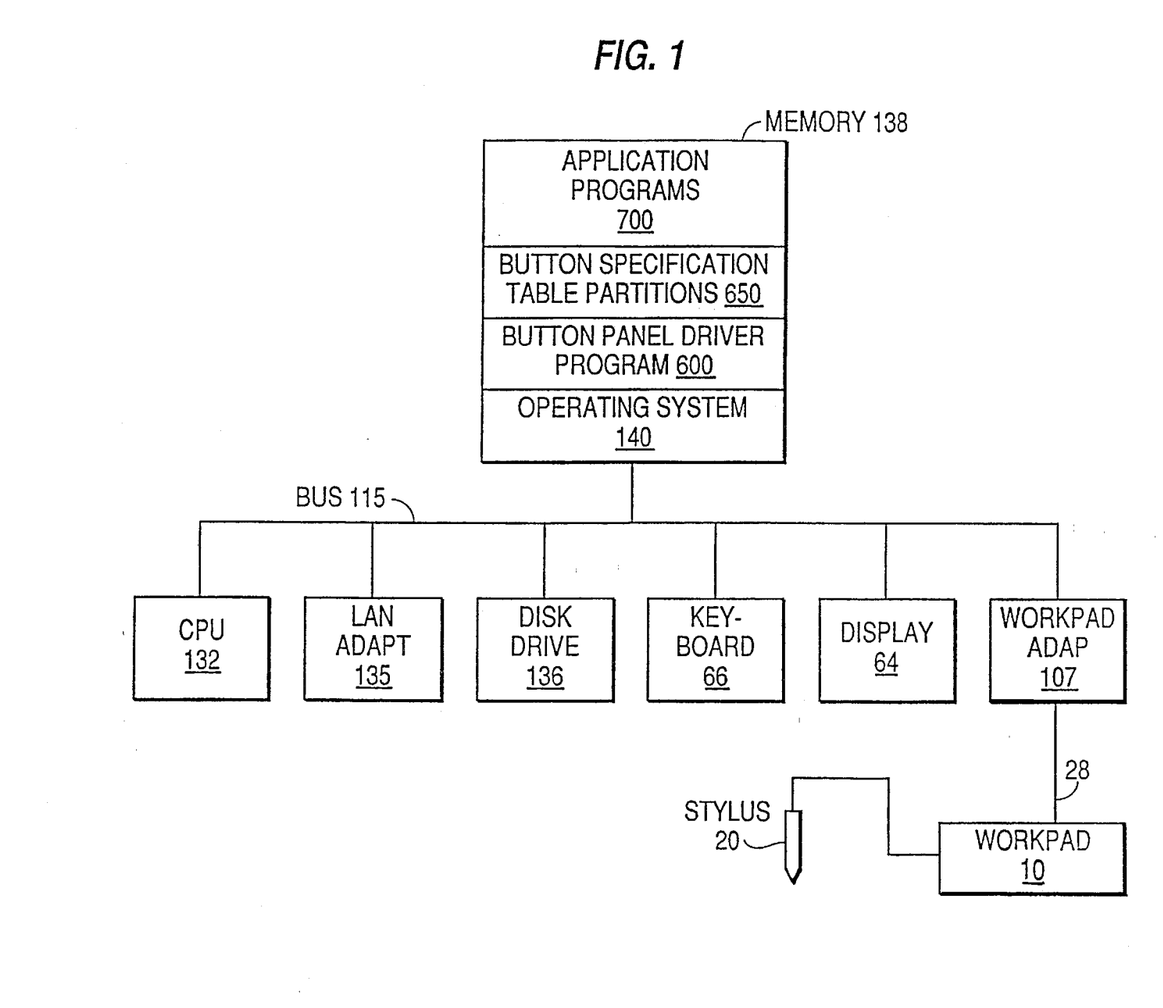
FIG. 1 is an overall architectural diagram of the data processing system which includes the invention.

FIG. 1 is an overall architectural diagram of the data processing system which includes the invention. The data processing system of FIG. 1 includes the memory 138 which is coupled by the bus 115 to the CPU 132, the local area network (LAN) adapter 135, the disk drive 136, the keyboard 66, the display monitor 64, the workpad adapter 107 which is connected over the wire 28 to the workpad 10, and the stylus 20 which is coupled to the workpad 10. The memory 138 stores the operating system 140, the button panel driver program 600, the button specification table partition 650, and application programs 700. Programs stored in the memory 138 are sequences of executable instructions which are executed by the CPU 132 to perform the intended functions and operations. A detailed description of the overall operation of the architecture shown in FIG. 1 can be found in the above cited U.S. Pat. No. 5,117,071 by Greanias, et al. which is incorporated herein by reference. The workpad 10 can be further described by reference to the copending U.S. patent application Ser. No. 07/351,227 entitled "Flat Touch Screen Workpad for a Data Processing System" by Gordon W. Arbeitman, et al., cited above and incorporated herein by reference. The stylus 20 can be further described by reference to the above cited U.S. Pat. No. 5,007,085 by Greanias entitled "Remotely Sensed Personal Stylus" which is incorporated herein by reference and also by the copending U.S. patent application Ser. No. 07/969,864 entitled architecture for communication of remote devices to a digitizing display, by Guy F. Verrier, et al., incorporated herein by reference, which was cited above.

Figure 2:
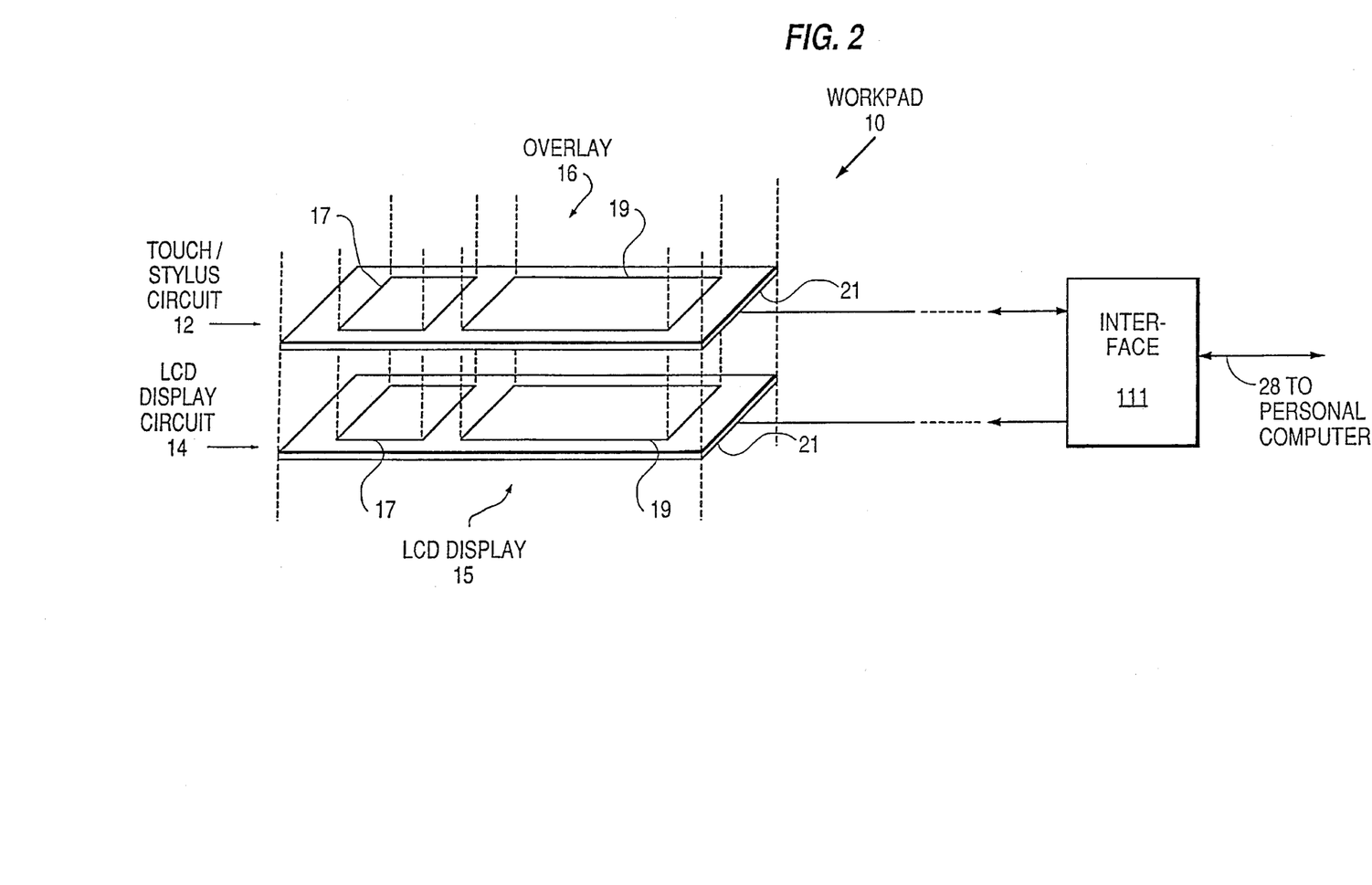
FIG. 2 illustrates the relative positioning of the overlay 16 and LCD display 15 in the workpad 10 in its relationship to the interface to the personal computer.
Figure 4:
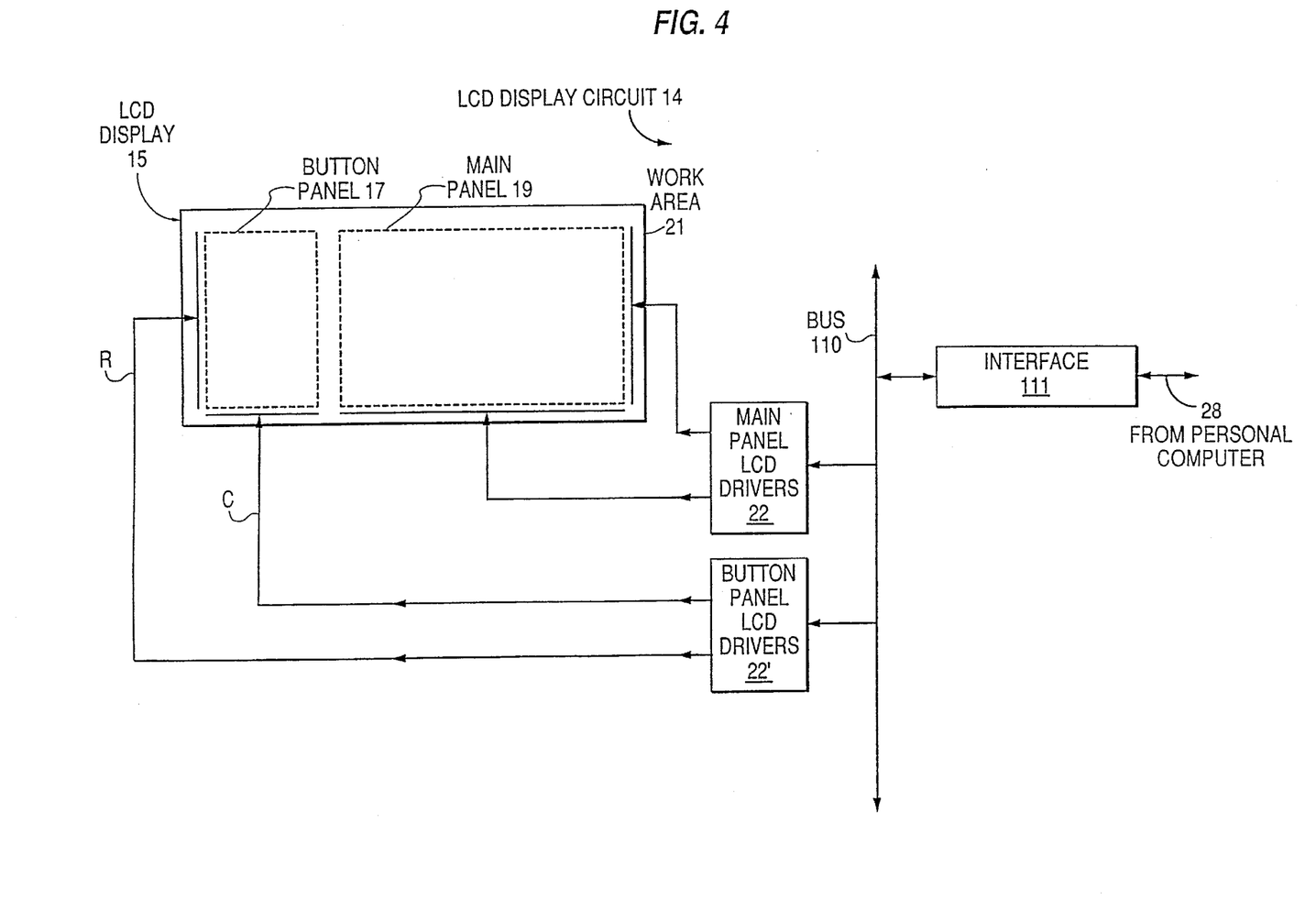
FIG. 4 is a schematic block diagram of the LCD display circuit 14.

FIG. 2 illustrates a more detailed view of the workpad 10, and in particular shows the two major components of the workpad 10, the LCD display 15 and overlay 16. The liquid crystal display (LCD) 15 is a flat panel display which displays images as a plurality of picture elements of pels, in response to the inputting of signals on wires arranged into rows R and columns C, as is indicated in the diagram of FIG. 4. A more detailed description of LCD displays can be found, for example, in the Arbeitman, et al. copending patent application cited above. The invention can also be applied to other forms of flat panel displays such is a gas panel display, light emitting diode (LED) panel displays, and can even be applied to bulkier displays such as cathode ray tube (CRT) monitors. In FIG. 2, the LCD display 15 is coupled through the interface 111 and over the line 28 to the personal computer system shown in FIG. 1, coupling through the workpad adapter 107. The LCD display 15 of FIG. 2 has its display surface encompassed within a work area 21. The display surface is partitioned into a main panel display region 19 and a button panel display region 17.

Also shown in FIG. 2 is the overlay 16 which is a touch sensitive and stylus detecting overlay described in greater detail in the above cited U.S. Pat. No. 4,686,332 entitled "Combined Finger Touch and Stylus Detection System for Use on the Viewing Surface of a Visual Display Device" by Greanias, et al., incorporated herein by reference, and in U.S. Pat. No. 5,117,071 entitled "Stylus Sensing System" by Greanias, et al., incorporated herein by reference, both of these references cited above. An additional description of the overlay can be found in the copending U.S. patent application Ser. No. 07/778,431 entitled "Touch Overlay for Improved Touch Sensitivity" by Greanias, et al., cited above. All of these references are incorporated herein by reference, as describing the touch/stylus overlay 16 of FIG. 2. For finger touch inputs, a capacitive coupling between a finger which touches the outward surface of the overlay 16, develops a signal which is transferred through the interface 111 and the wire 28 to the personal computer of FIG. 1. A rectangular array of horizontal and vertical wires which are shown in greater detail in FIG. 3, will pick up the capacitive signal from the finger touch and the combination of signals on those wires will indicate the location of the finger touch on the overlay 16. For stylus input, reference to FIG. 3 will show a stylus 20 which will pick up an electromagnetic signal radiated by the wires embedded in the overlay 16. The signal picked up by the stylus 20 is fed back to the stylus sensing circuitry which correlates the particular wires in the overlay 16 which are radiating at the time that the stylus picks up the signal. The correlated value is an indication of the location of the stylus with respect to the overlay 16. This location information is fed back through the interface 111 and the line 28 to the personal computer of FIG. 1.

FIG. 2 is significant in its illustrating the juxtaposed relationship of work area 21 for the LCD display 15 and the work area 21 of the overlay 16. More particularly, the touch overlay 16 has its touch input surface partitioned into a main panel touch region 17 which is juxtaposed with the main panel display region 17 of the LCD display 15. The touch overlay 16 is also partitioned into a button panel touch region 17 which is juxtaposed with the button panel display region 17 of the LCD display as shown in FIG. 2.

Figure 3:
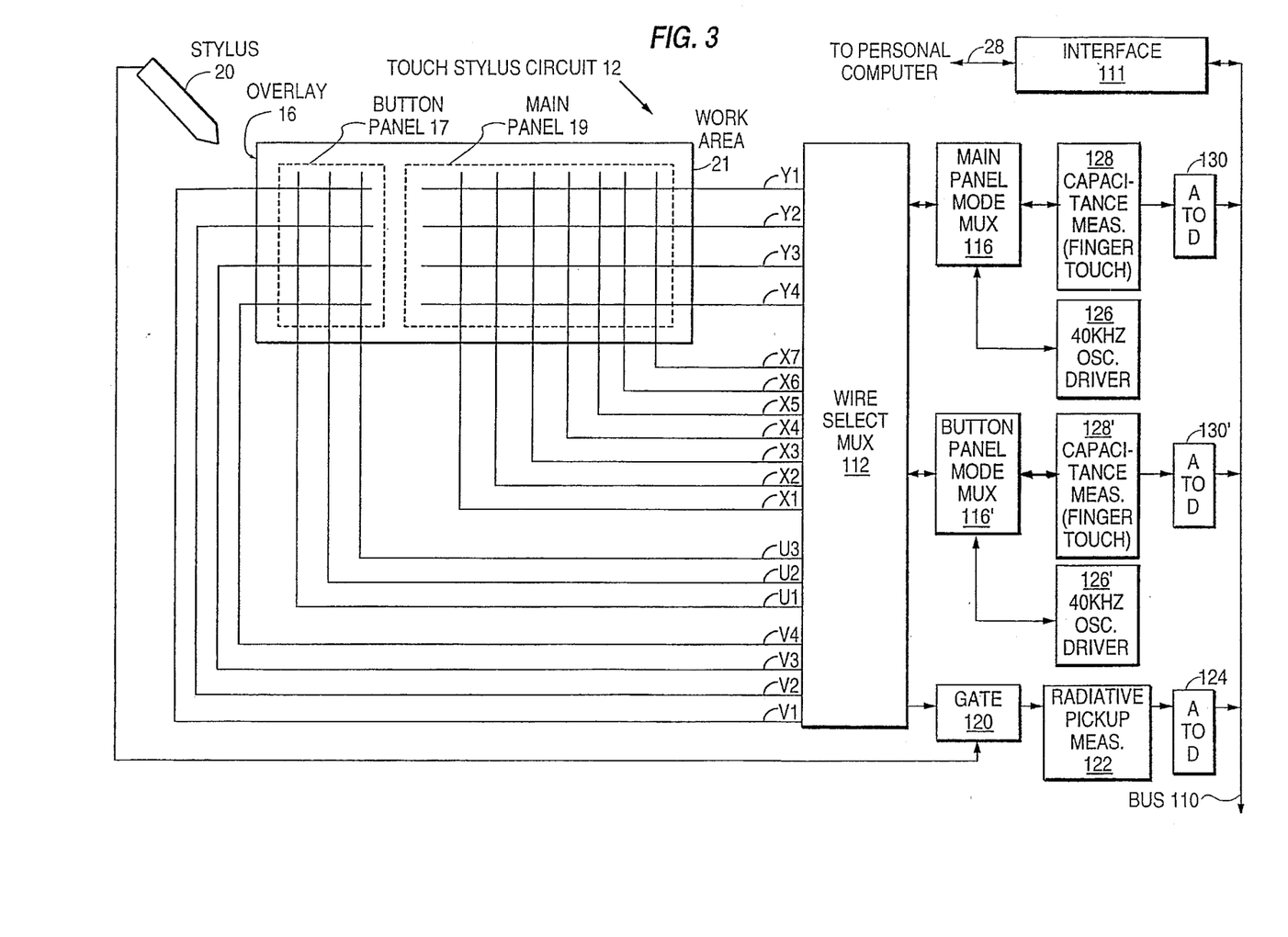
FIG. 3 is a circuit and logic block diagram of the touch/stylus circuit 12.

FIG. 3 illustrates the touch/stylus circuit 12, which includes the overlay 16 and the stylers 20. The overlay 16 is shown divided into the button panel 17 and the main panel 19 within the work area 21. In the finger touch detection mode, if the user finger is brought into a capacitive coupling contact with the overlay 16, the corresponding horizontal and vertical wires nearest the user's finger have their capacitance altered and this changing capacitance is sensed by the circuit 12. If the user's finger touches down in the main panel 19, an area closest to the horizontal wire Y1 and the vertical wire X1, then the wire select multiplexer 112 passes the capacitive signal from the wires X1 and Y1 to the main panel mode multiplexer 116 which passes the capacitive signal to the capacitance measuring (finger touch) circuit 128. The detected signal is recognized and then converted into a digital signal in the A-to-D converter 130 and is passed out on the bus 110 to the interface 111 which passes the signal over the line 28 to the personal computer of FIG. 1.

Alternately, if the user's finger touches down in the button panel 17 of the touch overlay 16, for example nearest the horizontal line V1 and the vertical U1, then the wire select multiplexer 112 transfers the capacitive signal from the user's finger to the button panel mode multiplexer 116' which passes the signal to the capacitance measurement (finger touch) circuit 128'. The signal output from the circuit 128' is then turned into digital signals in the A-to-D converter 130', and is output on the bus 110 through the interface 111 and the line 28 to the personal computer of FIG. 1.

Note that the horizontal and vertical wires for the button panel 17 are electrically isolated from the horizontal and vertical wires for the main panel 19. This separation enables the simultaneous detection of a finger touch in the button panel 17 when a finger touch also occurs in the main panel 19. This is useful in the simultaneous detection of a shift key such as the shift, alt, or control keys along with a typewriter QWERTY key which has been defined in the main panel 19. Also, mouse buttons such as the mouse button 1 and mouse button 2 which can be defined in the button panel 17 can be pressed simultaneously with the depression of a QWERTY key in the main panel 19.

In an alternate embodiment of the invention, the horizontal wires Y1–Y4 can be respectively electrically connected with the horizontal wires V1, V2, V3 and V4 of FIG. 3, where a simultaneous finger touch and stylus input are provided to the overlay 16. As has been described in the above cited U.S. Pat. No. 4,686,332 by Greanias, et al., a finger touch and a stylus detection event can be detected simultaneously. If a finger touch occurs within a button panel 17 and a stylus detection occurs within the main panel 19 at the same time, they can be separately identified, even though the horizontal lines Y1-Y4 extend all of the way across the main panel 19 and the button panel 17. The reverse situation can also occur where the stylus input occurs in the button panel 17 and the touch input occurs in the main panel 19 at the same time.

In the preferred embodiment of the invention, the stylus input is performed by the stylus 20 detecting an electromagnetic signal radiated from the wires embedded in the overlay 16. This is described in greater detail in the above cited U.S. Pat. No. 5,117,071 entitled "Stylus Sensing System" by Evon Greanias, et al. An antenna device inside the stylus 20 picks up electromagnetic signals radiated from the conductor wires U1, U2, U3 and V1, V2, V3, V4 within the button panel 17. The output of the stylus 20 is then coupled through the gate 120 and the radiative pickup measurement circuit 122. The wire select multiplexer 112 has an input to the gate 120, enabling the identification of which pair of wires U1, U2, U3 and V1, V2, V3, V4 are radiating at the time that the signal is picked up by the stylus 20. The output of the radiative pickup measurement circuit 122 is passed to the analog-to-digital converter 124 and is passed out through the bus 110 and the interface 111 and the wire 28 to the personal computer of Fig. 1. The signals radiated from the overlay 16 represent a positional information when detected by the stylus 20. The 40 kilohertz oscillator driver 126' drives through the button panel mode multiplexer 116' and the wire select multiplexer 112 to sequentially energize the horizontal wires V1, V2, U3, V4 and the vertical U1, U2, U3 in the button panel 17 of the overlay 16, in order to generate the electromagnetic radiation which is picked up by the stylus 20 and fed back to the gate 120. A similar operation pertains the horizontal wires Y1, Y2, Y3, Y4 and the vertical wires X1-X7 in the main panel 19 of the overlay 16. The radiated signals from the wires in the overlay 16 are picked up by the stylus 20 and are fed back through the gate 120 as previously described. The 40 kilohertz oscillator driver 126 drives through the main panel mode multiplexer 116 and the wire select multiplexer 112 to drive the horizontal wires Y1-Y4 and the vertical wires X1-X7 in a sequential pattern which is picked up by the stylus 20.

FIG. 4 illustrates the LCD display circuit 14. This circuit can also be applied to other forms of flat panel display such as the gas panel display and the light emitting diode display. The LCD display 15 shown in FIG. 4 is partitioned into the button panel 17 and a main panel 19 within the work area 21. The image information from the personal computer of FIG. 1 is passed through the workpad adapter 107 and the wire 28 to the interface 111 of the workpad 10. The interface 111 passes the image signals Over the bus 110 to the main panel LCD drivers 22 and the button panel LCD drivers 22'. The main panel 19 can be illuminated with the display of information that would normally be displayed on a CRT monitor connected to the personal computer of FIG. 1. In this example, the conventional QWERTY typewriter keys can be depicted in the main panel 19 which is driven by the main panel LCD drivers 22.

In accordance with the invention, the button panel 17 of the LCD display 15 can have the button panel LCD drivers 22' separately display the images of shift keys and mouse buttons on the LCD display 15. The button panel LCD drivers 22' drive the button panel 17 of the LCD display 15 by means of an array of row electrodes R and column electrodes C. The row electrodes R can be, for example, a 100 horizontally oriented electrodes connected to the R line, and the column electrodes can be for example, 20 vertical electrodes connected to the C line. The intersection of a row line and a column line can define a picture element or pel where a dot of light can be selectively generated. Images can be formed on the button panel 17 of the LCD display 15 by an appropriate combination of horizontal and vertical intersecting row and column lines which are energized in accordance with the pattern input through the interface 111 to the button panel LCD drivers 22'. This is described in more detail in the Arbeitman, et al. copending patent application cited above.

Figure 5:
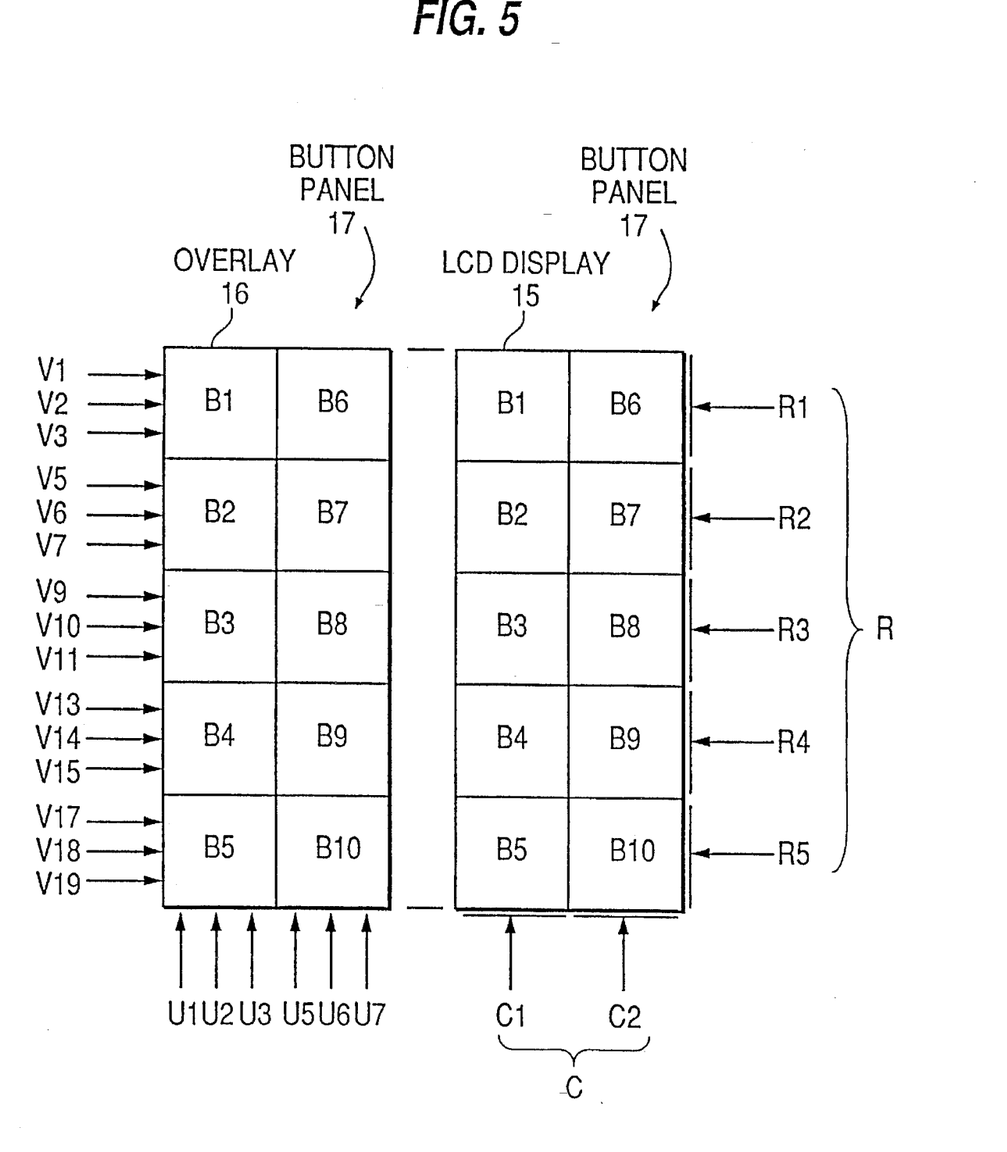
FIG. 5 illustrates the layout of the button panel for the overlay 16 and the button panel for the LCD display 15, which are juxtaposed in the workpad 10.

FIG. 5 illustrates an example partitioning of the button panel 17 of the touch overlay 16 into 10 button touch areas B1–B10. FIG. 5 also shows a corresponding partitioning of the button panel 17 of the LCD display 15 into 10 button display areas B1–B10, each of the button display areas in the LCD display 15 corresponding to a respective one of the button touch areas defined in the overlay 16. The button panel 17 of the overlay 16 has each button area defined by sets of horizontal lines V and vertical lines U. For example, the button touch area B1 of the overlay 16 has horizontal lines V1, V2 and V3 and vertical lines U1, U2 and U3 defined for it. If a finger touch or stylus detection occurs with a combination of any one of the horizontal lines V1, V2, V3 and any one of the vertical lines U1, U2, U3, then the touch stylus circuit 12 of FIG. 3 will determine that the button area B1 has been touched or has had its stylus detection. The buttons B1–B5 in the touch overlay 16 are defined by the horizontal lines V1, V2, U3, V5, V6, V7, V9, V10, V11, V13, V14, V15, and V17, V18, V19 in combination with the vertical lines U1, U2, U3. The button touch areas B6–B10 are defined by combinations of the indicated horizontal lines V1–V19 and the vertical lines U5, U6, U7. If only a single column of buttons are defined, for example if only buttons B1, B2,B3,B4 and B4are defined, and buttons B6–B10 are not defined for the touch overlay 16, then multiple button combinations from B1–B4can be simultaneously touched and their inputs distinguished by the touch stylus circuit 12 of FIG. 3.

FIG. 5 shows that the button display areas B1–B10 are defined with the row electrode sets R1–R5 and column electrode sets C1 and C2. For example, the button display area B1 in the LCD display 15 is defined by the row electrode set R1 and the column electrode C1. Buttons B1, B2, B3, B4 and B4in the LCD display 15 are defined by the horizontal electrode sets R1, R2, R3, R4, R5, respectively, along with the column electrode sets C1. The button display areas B6, B7, B8, B9 and B10 of the LCD display 15 are defined by the row electrode sets R1, R2, R3, R4, R5, respectively, along with the vertical electrode sets C2. If an image for example the phrase "mouse 1" is to be displayed by the button display area B1 in the LCD display 15 of FIG. 5, then the corresponding intersecting electrodes of the electrode set R1 and the vertical electrode set C1 are energized by the button panel LCD drivers 22' of FIG. 4.

Figure 6A:
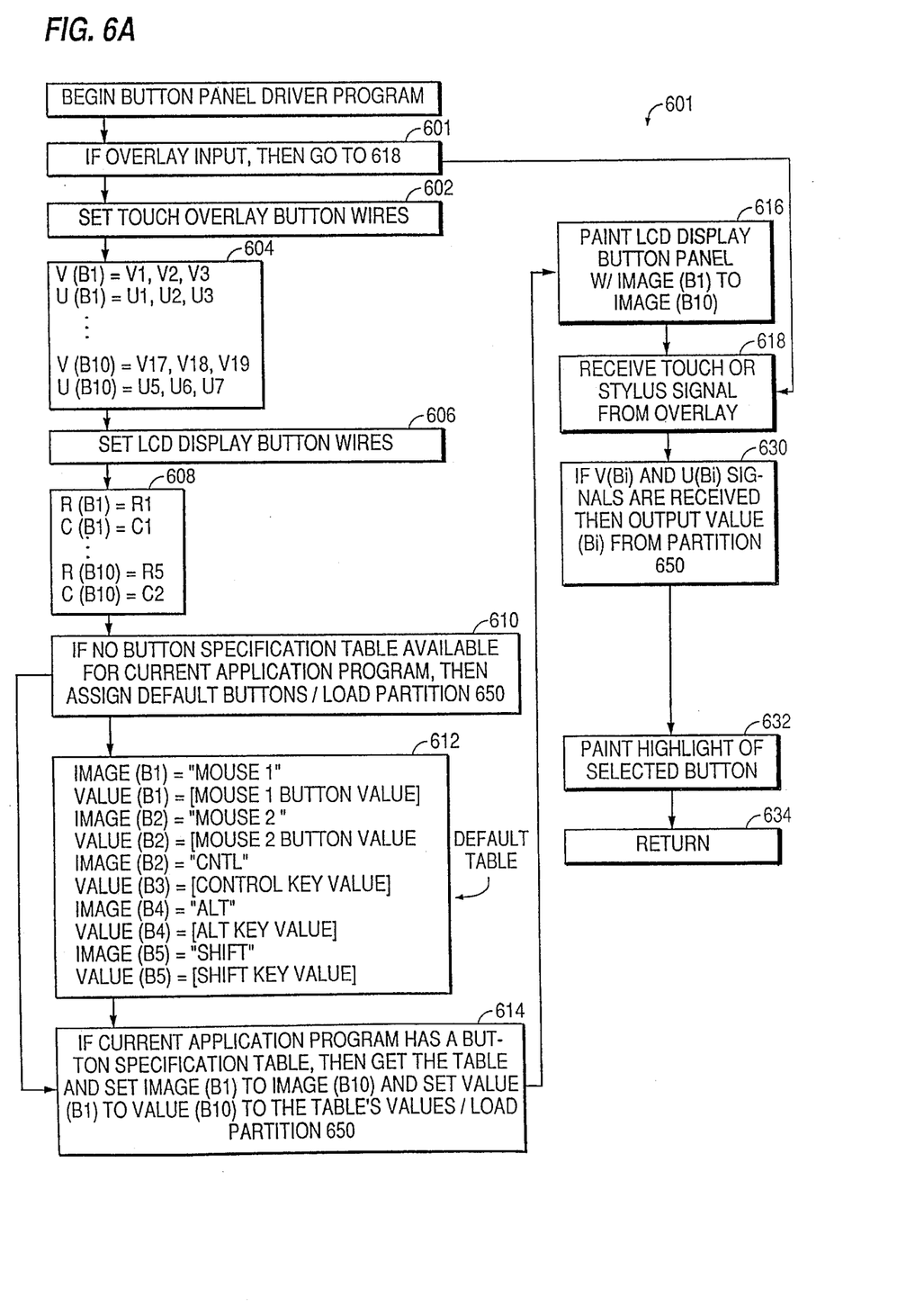
FIG. 6A is a flow diagram of a sequence of operational steps for the button panel driver program 600.
Figure 6B:
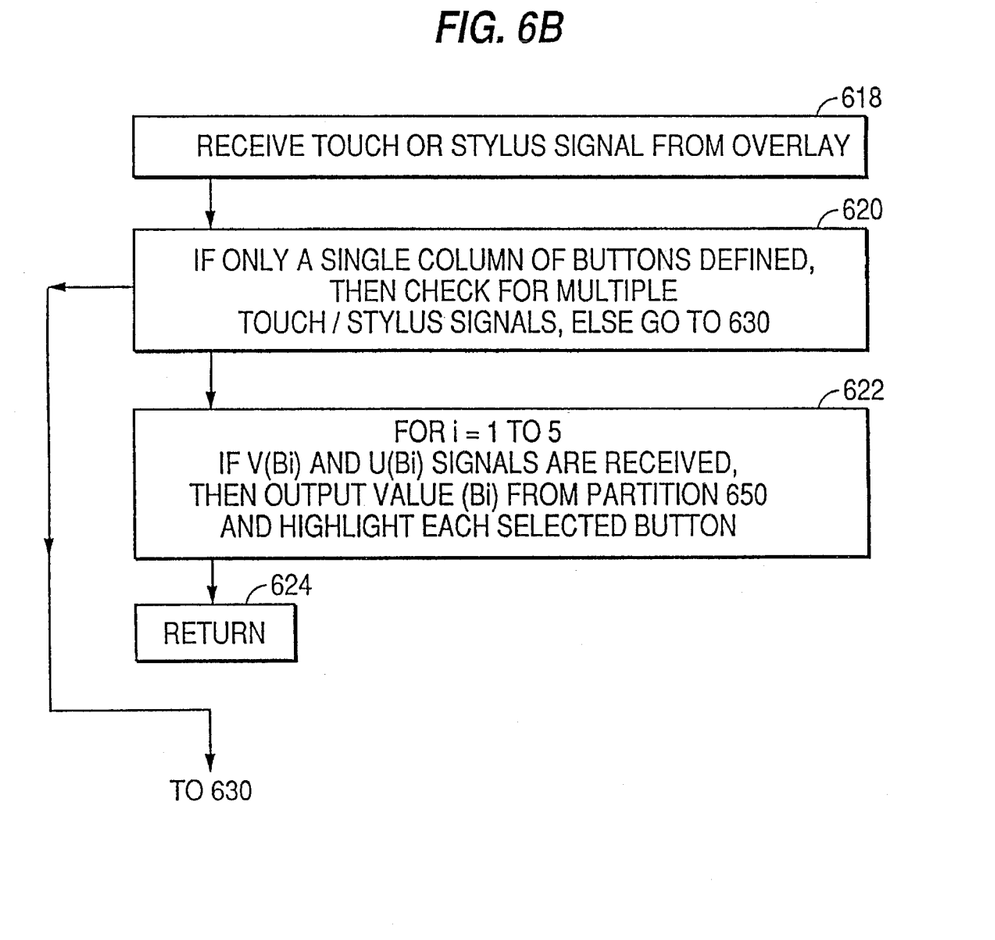
FIG. 6B is an alternate sequence of steps between step 618 and step 630 of the flow diagram of FIG. 6A.

FIGS. 6A and 6B show the button panel driver panel program 600. The button panel driver 600 is stored in the memory 138 of the personal computer FIG. 1, for defining the button touch areas of the button panel 17 in the overlay 16. The button panel driver program 600 also defines the button display areas in the button panel display region 17 of the LCD display 15. The button panel drive program 600 begins with step 601 which determines if there has been an overlay input and if there has, then the flow goes to step 618, which will be described later. In the setup mode, the program 600 flows to step 602 which sets the touch overlay button wire 602 as is seen in the table 604. The touch overlay button wires are related to each respective button touch area B1–B10 of the overlay 16, for example the button touch area B1 is related by the variable V(B1) as being set to equal either wire or V1, V2 or V3 and the variable U(B1) is being set equal to either the vertical wires U1, U2 or U3. In this manner, if any combination of a wire V1, V2, V3 for the horizontal wires and a single one of the vertical wires U1, U2, U3 is either touched or has a stylus detection event, then the button touch area B1 will be determined to have an input. The flow diagram of FIG. 6A then flows to step 606 which sets the LCD display button wires, as is shown in the table 608. In table 608, various ones of the button display areas B1–BLOC of the LCD display 15 are correlated with corresponding horizontal electrodes R1 –R5 and the vertical electrodes C1–C2. For example, the button display area B1 of the LCD display 15 has the variable R(B1) set equal to R1 and the variable C(B1) equal to C1. Thus, if the B1 button display area is to be illuminated with an image, the R1 and C1 sets of electrodes will be energized.

The flow diagram of FIG. 6A then flows to step 610 which determines if there has been no button specification table made available for the current application program 700, then the button panel driver program assigns the default buttons as are defined in the table 612. The table 612 default button specification is loaded into the button specification table partition 650 of the memory 138 in the personal computer of FIG. 1. The default table 612 shown in FIG. 6A includes pairs of variables for each button area to be defined. For example, the button area B1 has an image IMAGE (B1) variable set equal to the image "mouse 1." This will cause the horizontal electrode set R1 and the vertical electrode C1 for the LCD display 15 to be energized so as to illuminate the image of the "mouse 1." The default table 612 also has a corresponding variable VALUE (B1) equal [mouse 1 button value]. The scan code expression, for example, which represents the mouse button value for mouse 1 is stored within the brackets for the variable VALUE (B1). It is this expression which will be output by the panel driver program in response to the corresponding button touch area B1 having a touch input or stylus input detected by the overlay 16. The default table 612 shown in FIG. 6A defines a five buttons B1–B5 as follows. Button B1 is for "mouse 1." Button B2 is for "mouse 2." Button B3 is for "CNTL." This is the control key. Button B4 is for "ALT." This is the alt key value. Button B5 is the shift key. An illustration of the default layout for the button panel 17 is shown in FIG. 7B.

FIG. 6A also shows how the button panel driver program 600 can accommodate a customized button specification table provided by the user or provided by one of the application programs 700. Step 614 of FIG. 6A continues by determining if the current application program has a button specification table, then the button panel driver program gets the customized table and sets the variables IMAGE (B1) to IMAGE (B10) and the variables VALUE (B1) to VALUE (B10) to the custom tables' values. These values are then loaded into the button specification table partition 650 in the memory 138.

The flow diagram of FIG. 6A now passes to step 616 which paints the LCD display of each respective button image onto the corresponding button display area B1–B10 of the LCD display 15. This is done by taking the representation value of the variable IMAGE (B1) to IMAGE (B10) and using this information to appropriately drive the button panel LCD drivers 22' to illuminate the button panel 17 of the LCD display 15. An example of this is shown in FIG. 7B for the default button definition. An alternate example of this is shown in FIG. 7C for custom button definition.

The setup of the button panels for the overlay 16 and the LCD display 15 is now completed and the flow diagram of FIG. 6A can optionally go directly to the return step 634. Alternately, as is shown in the flow diagram of FIG. 7A, the flow can pass through the sequence of steps 618, 630 and 632 which will require the user to confirm his selection of the button panel 17 images by touching or providing a stylus input to the button panel as provided in step 618. Then step 630 determines if a one of the horizontal lines V1–V19 and one of the vertical lines U1–U7 have received touch input or stylus input signals and if they have, then the corresponding button value is output from the partition 650 to the operating system 140 or to the application program 700 as a selected shift button or mouse button event. The flow diagram of FIG. 6A then passes to step 632 which paints a momentary highlighting of the selected button B1–B10 on the LCD display 15, to provide user feedback indicating that the button which has been touched or designated by the stylus has been recognized by the system. Then the flow diagram flows to the return step 634 which returns to the main program.

Thus it is seen that the button panel driver program stored in the computer defines button touch areas in the button panel touch region for outputting a button value when the particular button touch area receives a touch or stylus input. Then further, the button panel driver program defines button display areas in the button panel display region, which are juxtaposed with the button touch areas. The button display areas display a button indicium representing the button value and identify the location of the button touch area. Further, the button panel driver program enables the computer to receive a first touch or stylus input in the button touch area and in response thereto, output a button value. Since the button panel 17 and the main panel 19 for the overlay 16 are electrically isolated in a preferred embodiment, a simultaneous touch input can occur in the main panel touch region with the button touch input in a button touch area of the button panel, and both touched areas can be separately identified by the touch dial circuit 12. Correspondingly, if two styluses are available to the system, then multiple, simultaneous stylus inputs can be accommodated one in the button panel 17 and one in the main panel 19, and they can be separately identified by the touch/stylus circuit 12.

Figure 7A:
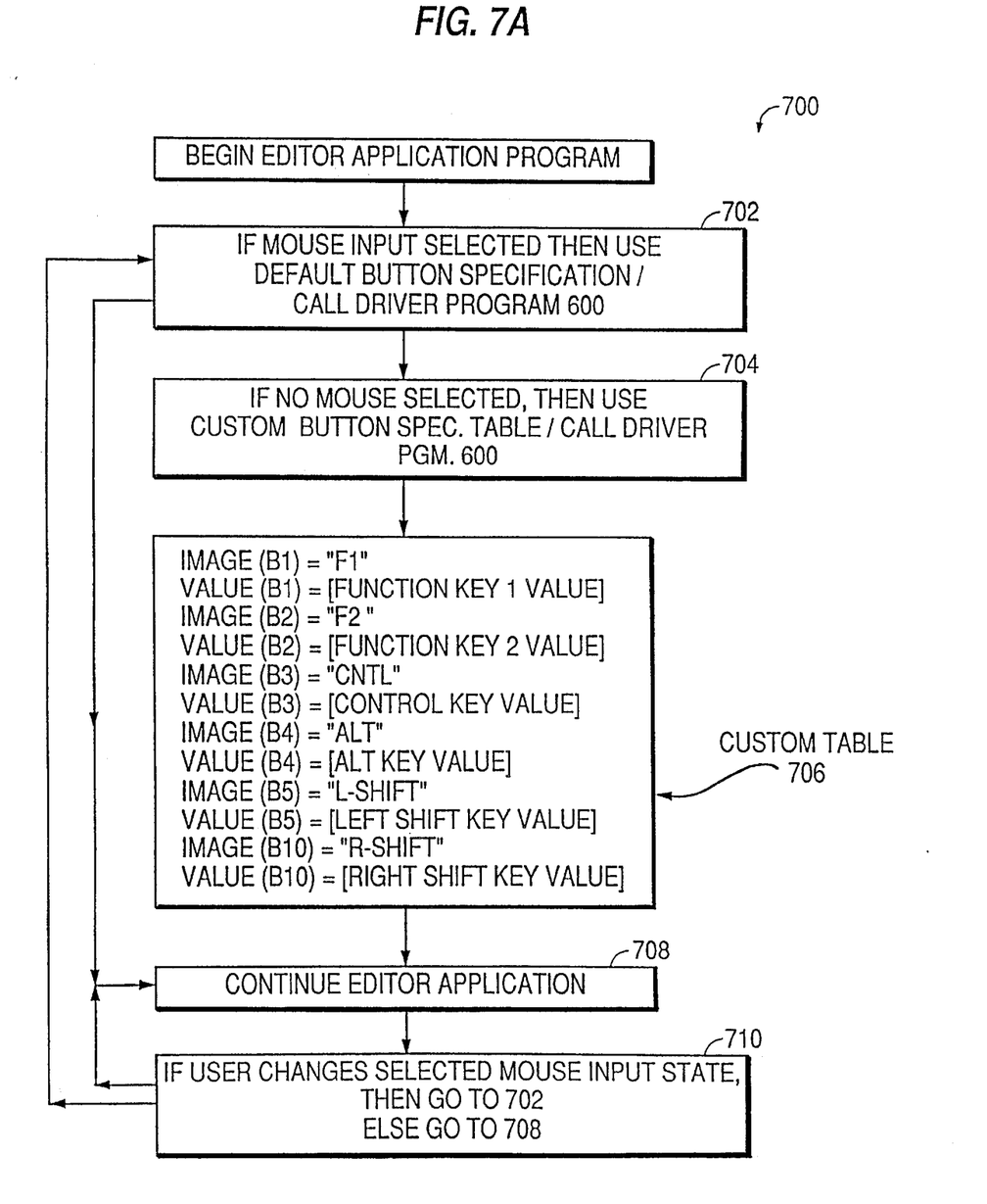
FIG. 7A is a flow diagram of a sequence of operational steps for an example editor application program.
Figure 7B:
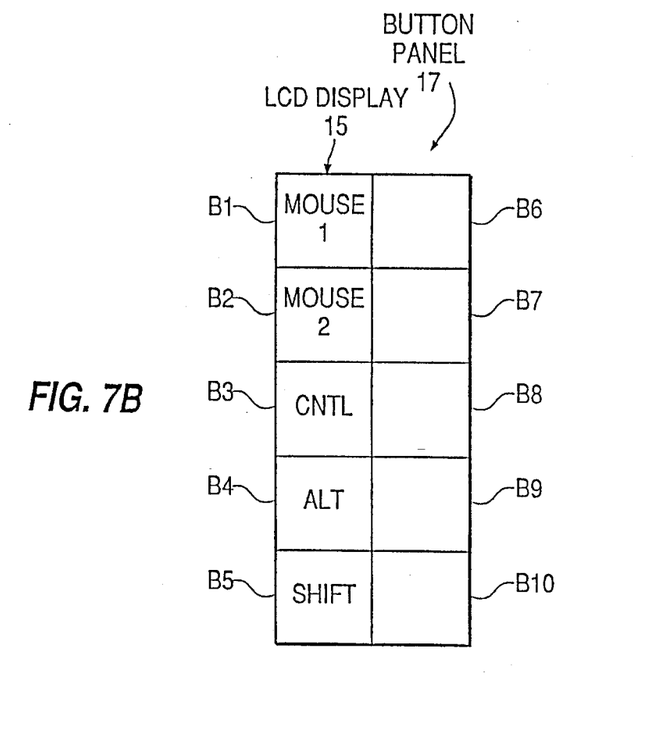
FIG. 7B illustrates the layout of the default button definition.
Figure 7C:
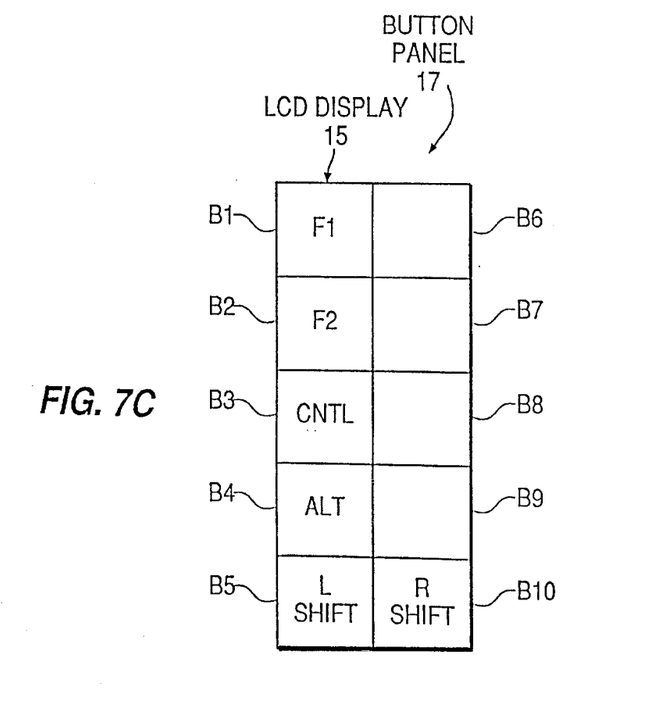
FIG. 7C illustrates the layout of a custom button definition.

FIG. 7A shows an example flow diagram of a sequence of operational steps for an editor application program 700 which can be stored in the memory 138 of the personal computer of FIG. 1. The editor application program includes a custom button specification table 706. In this example, the editor application program 700 allows the user to select whether he wishes to use a mouse pointing device or not use a mouse pointing device during the session with the editor application. In step 702 of FIG. 7A, if the user has selected to use the mouse input, then in accordance with this example, step 702 uses the default button specification provided by the button driver program 600. Step 702 calls the driver program 600. As can be seen in FIG. 6A, the button panel driver program 600 starts at step 601 and determines that there has been no overlay input, and then flows to the sequence of step 602 through step 610, which assigns the default buttons to find in the default table 612 and loads the default button specification into the partition 650 of the memory 138. The button panel driver program 600 then flows to the return step 634 which returns to step 702 of the editor application program of FIG. 7A. Step 702 then flows to the step 708 which continues the editor application.

Alternately, in the editor application program of FIG. 7A, if the user has selected not to use the mouse pointing device, then step 702 flows to step 704 which determines that no mouse has been selected, and then step 704 will use the custom button specification table 706 provided by the editor application program. The custom table 706 includes alternate button definitions for the buttons B1, B2, B3, B4, B4 and B10, as is shown in FIG. 7C. Step 704 of FIG. 7A calls the driver program 600. The driver program 600 of FIG. 6A then flows to step 601 which determines that no overlay input has occurred and then flows through steps 602 through 608 defining the touch overlay button wires and the LCD display button wires. Then in step 610, since there is a button specification table available for the current application program, namely the table 706 of FIG. 7A, step 610 flows to step 614. Step 614 in FIG. 6A determines that the current application program has a button specification table and then it gets the table 706 and sets the button images and the button values equal to the values provided in the custom table 706 as shown in FIG. 7A. The custom table's values are then loaded into the partition 650 of memory 138 by step 614. Then in step 616 of FIG. 6A, the button display areas of the button panel 17 for the LCD display 15 are painted with the images specified in the custom table 706. Then the button panel driver program of FIG. 6A flows to the return step 634, which returns to step 704 of the editor program of FIG. 7A. The flow diagram of FIG. 7A then flows to step 708 which continues the editor application.

During the course of continuing the editor application in FIG. 7A, if the user elects the mouse input state, then step 710 goes to step 702 which determines whether a mouse input has been selected or deselected and then correspondingly either the default button specification 612 or the custom table specification 706 or another user supplied button specification table will be loaded into the button specification table partition 650 by the button panel driver program 600.

Thus it is seen that the touch sensitive buttons for a digitizing display can be dynamically labeled and relabeled. The invention allows the simultaneous touch inputs or simultaneous stylus inputs both the button panel 17 and the main panel 19. Shift buttons and mouse buttons can be labeled according to their functions, the buttons can be dynamically relabeled by application programs or by the user, multiple buttons can be simultaneously depressed and this can be done with existing programs which do not provide any information on customized button layouts. The user is provided with feedback every time a button is pressed and buttons can be used for designating other functions such as system functions of displaying the time, turning off the main screen, selecting a printer, or other system functions.

FIG. 6B shows a modified sequence of operational steps for the button panel driver program 600. FIG. 6B inserts additional steps between the existing steps 618 and 630, to detect multiple shift buttons which are depressed in a column of buttons defined in the button panel 17. This can be performed where only a single column of buttons have been defined; either all of the buttons are defined for B1, B2, B3, B4, B4 or alternately all of the buttons are defined only for the column for buttons B6, B7, B8, B9 and B10, as is shown in FIG. 5. In FIG. 6B, existing step 616 receives a touch or stylus signal from the overlay. Then the step 620 determines if only a single column of buttons has been defined in the button panel 17; then a check can be made for multiple touch or stylus signals within the button panel 17. Otherwise the flow goes to the existing step 630. Step 620 then flows to step 622 which starts a loop for an index i from 1 to 5, for in this example five buttons being defined as a maximum number of buttons in a column. If a signal wire V(Bi) for horizontal wires and a vertical wire U(Bi) signals are received, then step 622 outputs the button VALUE (Bi) from the partition 650 and highlights each selected button for user feedback. Then step 622 flows to step 624 which returns to the calling program. The modified steps of FIG. 6B allow multiple buttons in a column in the button panel 17 to be detected for either simultaneous touch or simultaneous stylus inputs.

Although a specific embodiment of the invention has been disclosed, it will be understood by those having skill in the art that changes can be made to that specific embodiment without departing from the spirit and the scope of the invention.

What is claimed is:

1. A data processing system, a digitizing display for inputting two simultaneous touch inputs, comprising:

a display coupled to a computer, having a display surface partitioned into a main panel display region and a button panel display region;

a touch overlay coupled to said computer, having a touch input surface partitioned into a main panel touch region juxtaposed with said main panel display region, and partitioned into a button panel to each region juxtaposed with said button panel display region;

means for electrically isolating the main panel and button regions in the display and touch overlay;

a button panel driver program stored in said computer, for defining a button touch area in said button panel touch region in accordance with a button specification table, for outputting a button value when said button touch area receives a touch input;

said button panel driver program defining a button display area in said button panel display region, juxtaposed with said button touch area, said button display area for displaying a button indicium representing said button value and identifying the location of said button touch area;

said computer receiving a first touch input in said main panel touch region and a simultaneous second touch input in said button touch area and in response thereto, outputting a panel value and said button value, the multiple, simultaneous panel and button values being separately identified in a touch circuit;

said computer storing a default button specification table describing a plurality of button touch areas and corresponding button display areas in the event a button specification table is not available;

said button panel driver program using said default table to reconfigure said plurality of button touch areas in said touch overlay and said corresponding button display areas in said display;

an application program stored in said computer, having an alternate button specification table describing a plurality of alternate button touch areas and corresponding alternate button display areas for selection by a user; and said button panel driver program using said alternate table to configure said plurality alternate button touch areas in said touch overlay and said corresponding alternate button display areas in said display when selected by the user.

2. The system of claim 1, which further comprises:

said touch overlay including both a touch input detection means and a radiative stylus pickup means.

3. The system of claim 2, which further comprises:

said computer receiving said second touch input as a radiative stylus input in said button touch area and in response thereto, outputting said button value.

4. The system of claim 1, which further comprises:

said button panel driver program defining an alternate button value and an alternate button indicium representing said alternate button value at said location of said button touch area.

5. The system of claim 2, which further comprises:

said computer receiving said first touch input as a radiative stylus input in said main panel touch region and said second touch input in said button touch area and in response thereto, outputting said button value.

6. In a data processing system, including a digitizing display for inputting either a touch or a stylus input, an apparatus for processing two simultaneous inputs, comprising:

a display means coupled to a computer, partitioned into a main panel display region and a button panel display region;

a touch/stylus overlay coupled to said computer, partitioned into a main panel touch/stylus region juxtaposed with said main panel display region, and partitioned into a button panel touch/stylus region juxtaposed with said button panel display region;

means for electrically isolating the main panel and button regions in the display and touch overlay;

a button panel driver program stored in said computer, for defining a button touch/stylus area in said button panel touch/stylus region in accordance with a button specification table, for outputting a button value when said button touch/stylus area has either a touch or a stylus input;

said button panel driver program defining a button display area in said button panel display region, juxtaposed with said button touch/stylus, said button display area in the event a button specification table is not available for displaying a button indicium representing said button value and identifying the location of said button touch/stylus area;

said computer receiving a first touch or stylus input in said main panel touch/stylus region and a simultaneous second touch or stylus input in said button touch/stylus area and in response thereto, outputting a panel value and said button value, the multiple, simultaneous panel and button values being separately identified in a touch/stylus circuit;

said computer storing a default button specification table describing a plurality of button touch areas and corresponding button display areas;

said button panel driver program using said default table to reconfigure said plurality of button touch areas in said touch overlay and said corresponding button display areas in said display;

an application program stored in said computer, having an alternate button specification table describing a plurality of alternate button touch areas and corresponding alternate button display areas for selection by a user in dynamically reconfiguring the button touch area;

said button panel driver program using said alternate table to define said plurality alternate button touch areas in said touch overlay and said corresponding alternate button display areas in said display when selected by a user.

7. The apparatus of claim 6, which further comprises:

said button panel driver program defining an alternate button value and an alternate button indicium representing said alternate button value at said location of said button touch area.

8. The system of claim 1 or 6 further comprising:

a) multiplexer means coupled to the main and button panels of the display and overlay and in response to multiple, simultaneous inputs signals thereto providing separate output signals from the main and button panels.

9. The system of claim 8 further comprising:

a) separate driver means coupled to the button and main panels of the display.

10. The system of claim 1 or 6 further comprising:

a) means for confirming the button indicium on the display before receiving the simultaneous, multiple touch inputs to the main and button panels of the overlay.

11. In a data processing system, including a digitizing display for inputting either a touch or a stylus input to a reconfigurable shift button in a button panel, a method for processing a shift button input, comprising the steps of:

storing first values in said system, identifying touch/stylus overlay button wires corresponding to a touch/stylus shift button on said digitizing display;

storing second values in said system, identifying a location for display on an indicium, said location corresponding to said touch/stylus shift button on said digitizing display;

storing an image of said indicium in said system, related to said second values;

displaying said indicium image at said location;

storing a button value representing said shift button, in said system, accessible by said first values;

receiving a touch/stylus input in said system, from said button wires and in response thereto, using said first values to access said button value;

outputting said button value in response to said shift button input;

storing third values in said system, identifying touch/stylus overlay button wires corresponding to an alternate touch/stylus shift button on said digitizing display;

storing fourth values in said system, identifying a location for display of a second indicium, said location corresponding to said alternate touch/stylus shift button on said digitizing display;

storing an image of said second indicium in said system, related to said fourth values; and automatically changing said shift button to said alternate shift button on said digitizing display, by substituting said third values for said first values and substituting said fourth values for said second values and substituting said second indicium for said first indicium in the event a custom button panel table is not present in the system.

12. In a data processing system comprising a processor, at least one input device, a memory containing stored program instructions, and a display including a touch overlay panel, both the display and overlay panels divided into electrically isolated button and main panels, the button panel being reconfigurable into different button values, a method for providing multiple, simultaneous touch inputs to the overlay and outputting separate identifiable output signals to the system, comprising the steps of:

a) initiating a button panel driver program stored in the memory;

b) defining touch points for the overlay in a first table stored in the memory;

c) defining touch points for the display in a second table stored in the memory;

d) setting the touch points in the overlay in accordance with the first table;

e) setting the touch points in the display in accordance with the second table stored in the memory;

f) defining a default button table of images and values for the display and overlay button panels and storing the default button table in a partition in the memory;

g) initiating an application program stored in the memory;

h) determining if a button specification table of images and values for the display and overlay button panels is stored in the memory for the application program;

i) assigning the default images and values to the button panels of the display and overlay, if no button specification table exists in memory for the application or assigning the button images and values to the button panels of the display and overlay if the button specification table for the application is available in the memory;

j) painting the display with the images and values assigned in step (i);

k) receiving multiple, simultaneous touch inputs to the button and main panels of the overlay; and l) outputting separately identifiable output signals from the system for the multiple simultaneous touch inputs in accordance with assigned images and values for the display and overlay.

13. The method of claim 12 further comprising the steps of:

m) defining and storing a custom button specification table for a selected application program stored in the memory;

n) selecting either the default button specification table or the custom button specification table for use with the selected application program;

o) performing steps (b) through (h); and p) initiate operation of the selected application program using the default button specification table or the custom button specification as selected by step (n).

* * * * *